United States Patent
Zamir (10) Patent No.: US 10,445,188 B2
(45) Date of Patent: Oct. 15, 2019

(54) METHOD AND SYSTEM FOR VIRTUALIZING GUEST-GENERATED FILE SYSTEM SNAPSHOTS

(71) Applicant: VMware, Inc., Palo Alto, CA (US)

(72) Inventor: Tal Zamir, Haifa (IL)

(73) Assignee: VMware, Inc., Palo Alto, CA (US)

( * ) Notice: Subject to any disclaimer, the term of this patent is extended or adjusted under 35 U.S.C. 154(b) by 493 days.

(21) Appl. No.: 15/090,365

(22) Filed: Apr. 4, 2016

(65) Prior Publication Data

US 2017/0286230 A1  Oct. 5, 2017

(51) Int. Cl.
  *G06F 17/00* (2019.01)
  *G06F 11/14* (2006.01)
  *G06F 9/455* (2018.01)
  *G06F 16/11* (2019.01)
  *G06F 16/188* (2019.01)

(52) U.S. Cl.
  CPC ...... *G06F 11/1451* (2013.01); *G06F 9/45558* (2013.01); *G06F 16/128* (2019.01); *G06F 16/188* (2019.01); *G06F 2009/45562* (2013.01); *G06F 2009/45583* (2013.01); *G06F 2201/84* (2013.01)

(58) Field of Classification Search
  CPC ....... G06F 9/45558; G06F 2009/45595; G06F 3/065; G06F 2009/45583; G06F 2009/45587
  See application file for complete search history.

(56) References Cited

U.S. PATENT DOCUMENTS

2015/0067390 A1*  3/2015  Blake ............... G06F 9/45558
                                                              714/15
2016/0019002 A1*  1/2016  Kurtin .............. G06F 3/0619
                                                              711/162

* cited by examiner

Primary Examiner — Truong V Vo
(74) Attorney, Agent, or Firm — Patterson + Sheridan, LLP (57) ABSTRACT

Techniques disclosed herein provide an approach for creating snapshots and reverting to the same for virtual machine (VM) guest operating systems (OSes). In one embodiment, a snapshot module in a guest OS receives blocks for a snapshot of a guest OS volume. In turn, the snapshot module creates a snapshot file in a repository external to a virtual disk of the VM, and writes the received blocks to the external repository. By storing snapshot content outside the virtual disks of VMs, disk space limitations in local VM disks can be overcome, and it is also more difficult for malicious software to modify the snapshots and infect them. To reduce storage space requirements, snapshots stored in the external repository may be deduplicated with other snapshots stored therein, including snapshots from guest OSes running in other VMs and/or a host OS on which a hosted hypervisor runs.

20 Claims, 5 Drawing Sheets

METHOD AND SYSTEM FOR VIRTUALIZING GUEST-GENERATED FILE SYSTEM SNAPSHOTS

BACKGROUND

Operating system (OS) users often need to return their systems to earlier states to undo installation of unwanted applications/malware, among other things. To support this functionality, OSes have provided mechanisms, such as Microsoft® Windows's "System Restore," that take snapshots of the file system and permit a user to revert the system to earlier points in time by restoring system files and settings using the snapshots. Windows users are permitted to create their own restore points, and the system also creates restore points automatically, e.g., before an application is installed.

Reversion mechanisms such as Windows's "System Restore" have a number of drawbacks. For instance, storing OS snapshots reduces the amount of disk space available to users, so the amount of storage allotted to snapshots may be limited to a certain percentage of available space (e.g., 20%). However, this tends to defeat the purpose of storing snapshots, as older snapshots are typically deleted when the limited storage space is exceeded, which means that the system can no longer be reverted to those snapshots. Further, reverting to a snapshot requires copying data from the snapshot back to a volume, which can take a long time (e.g., several minutes). The snapshot itself can also be infected by certain malware and advanced persistent threats (APTs) that then cannot be removed by reverting to the snapshot.

SUMMARY

One embodiment provides a computer-implemented method of creating a snapshot of a guest operating system (OS) volume, the guest OS running in a virtual machine (VM) on top of a hypervisor. The method generally includes receiving, for the snapshot, copies of changed blocks in the guest OS volume obtained via a copy-on-write technique. The method further includes creating a snapshot file in a block storage external to a virtual disk of the VM, where the external block storage is shared by a plurality of VMs running on top of the hypervisor. In addition, the method includes writing the received blocks to the snapshot file in the external block storage.

Further embodiments include a non-transitory computer-readable storage medium storing instructions that when executed by a computer system cause the computer system to perform the method set forth above, and a computer system programmed to carry out the method set forth above.

DETAILED DESCRIPTION

Embodiments presented herein provide techniques for creating snapshots and reverting to the same for virtual machine (VM) guest operating systems (OSes). In one embodiment, a snapshot module in a guest OS receives copy-on-write blocks for a guest OS volume snapshot. In turn, the snapshot module creates a snapshot file in a repository external to a virtual disk of the VM, and writes the received blocks to the external repository. Each changed block is stored at an offset of the snapshot file, and a metadata block mapping that maps the offsets to blocks in the external storage (e.g., based on a checksum calculated for each block) may further be stored. By storing snapshot content outside the VM virtual disk, disk space limitations in the local disk (i.e., the virtual disk) are overcome, and it is also more difficult for malicious software such as advanced persistent threats (APTs) to modify snapshots and infect them. To reduce storage space requirements, snapshots stored in the external repository may also be deduplicated with other snapshots stored in the repository, including snapshots from guest OSes running in other VMs and/or from a host OS on which a hosted hypervisor runs. The external repository then only stores unique blocks, and the metadata block mapping for each snapshot indicates which unique blocks correspond to which offsets of the snapshot.

In one embodiment, reverting to a snapshot includes powering off a VM, overlaying the snapshot's block mapping on top of the VM's current virtual disk, and powering the VM back on. The overlaying of the snapshot's block mapping can be performed substantially instantaneously by a module in the hypervisor or host OS, without copying any block data, by creating from the block mapping a synthetic block device that is a mapping into the external repository and emulates a virtual disk, and then adding the synthetic block device as a delta disk on top of the current virtual disk. Even if the guest OS has completely malfunctioned and is unable to perform the traditional "revert to restore point" functionality, the hypervisor or host OS module may still be able to revert to a snapshot by this process.

Reference will now be made in detail to several embodiments, examples of which are illustrated in the accompanying figures. The figures depict embodiments for purposes of illustration only. One skilled in the art will readily recognize from the following description that alternative embodiments of the structures and method illustrated herein may be employed without departing from the principles described herein.

Figure 1:
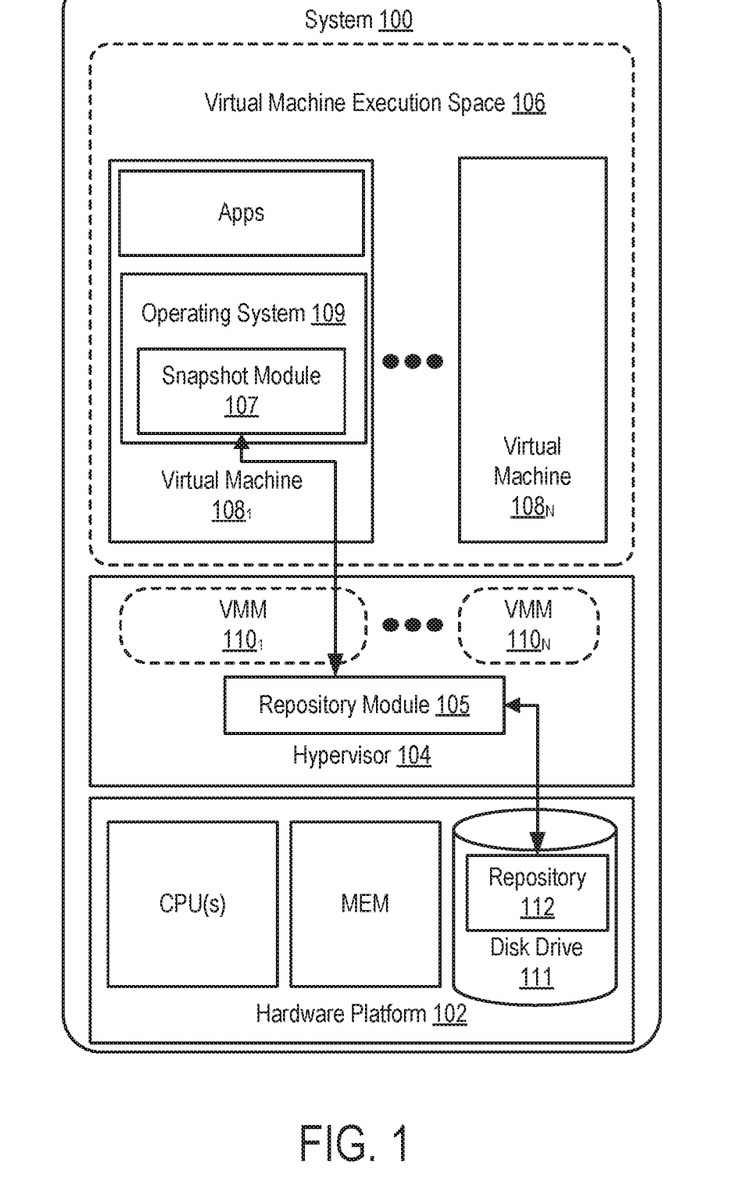
FIG. 1 illustrates components of a system in which an embodiment may be implemented.

FIG. 1 illustrates components of a system 100 in which an embodiment may be implemented. As shown, system 100 includes a hardware platform 102, and a virtualization software layer 104 that provides a VM execution space 106 runs on hardware platform 102. In one embodiment, system 100 may be constructed on a server class hardware platform such as an x86 architecture platform that includes a processor, system memory, and disk drive, among other things. Although a single computer system 100 is shown, it should be understood that multiple systems may be employed in, e.g., a server cluster that is connected to client devices via a network (e.g., the Internet) and provides a virtual desktop infrastructure (VDI).

Virtualization software layer 104 (also referred to herein as the "hypervisor"), is installed on top of hardware platform 102 and supports VM execution space 106 within which multiple VMs $108_{1-N}$ running desktop operating systems and applications may be concurrently instantiated and executed. In one embodiment, for each VM running on system 100, hypervisor 104 provides a corresponding virtual machine monitor (VMM) $110_{1-N}$ that implements virtualization support such as emulated hardware to coordinate operations between hypervisor 104 and the VM.

For conciseness, only VM $108_1$ will be discussed in detail, but it should be understood that other VMs $108_{2-N}$ may be similarly configured. As shown, guest OS 109 runs in VM $108_1$, and applications run on guest OS 109. Guest OS 109 includes a snapshot module 107, which receives copy-on-write blocks for a snapshot of a guest OS 109 volume and communicates with a repository module 105 in hypervisor 104 to create a snapshot file for storing the snapshot content in a repository 112 outside the virtual disk of VM $108_1$. Although discussed herein primarily with respect to volumes, it should be understood that techniques disclosed herein are equally applicable to partitions. For example, Microsoft® Windows's volume shadow copy service implements a copy-on-write mechanism that copies blocks of a guest OS volume when those blocks are changed, and snapshot module 107 may be implemented as a plugin to the volume shadow copy service that receives copied blocks and stores the received blocks in repository 112 outside the virtual disk of VM $108_1$. More specifically, Microsoft® Windows's volume shadow copy service asks participating applications (called writers) to flush their data to the file system so that the data is logically consistent on disk when a snapshot is taken, and the service may then freeze all write I/Os for a few seconds to allow snapshot module 107 to create the volume snapshot, which is also referred to a "shadow copy" of the volume. It should be understood that the snapshot of the guest OS 109 volume is different from a typical snapshot of a virtual disk, as the snapshot of the guest OS 109 volume is at the partition/volume level (e.g., a snapshot of the C: drive or the D: drive, rather than the entire virtual disk) and such partition/volume level snapshots are further triggered by the guest OS 109 (e.g., on important guest events) rather than by the hypervisor.

Repository module 105 maintains external repository 112 in which snapshots from VM $108_1$ and other VMs $108_{2-N}$ are collectively stored. Repository 112 is external to virtual disks (e.g., .vmdk files) of the VMs, as the external repository 112 may actually be stored in the same storage device as the virtual disks, or in separate storage device(s). It will be understood that the guest OS partition in which snapshots are typically stored would be part of the VM's virtual disk. In one embodiment, external repository 112 may be a block storage, and blocks that are stored may be identified by checksums for deduplication purposes. Repository module 105 is responsible for deduplicating snapshots stored in external repository 112 to reduce storage space requirements, and reverting guest OSes to stored snapshots by overlaying the snapshots' block mappings on top of current virtual disks, as discussed in greater detail below. By storing snapshots in repository 112 external to virtual disks of VMs $108_{1-N}$, disk space limitations in VM $108_{1-N}$'s local disks (i.e., the virtual disks) can be overcome, and it is also more difficult for malicious software such as APTs to modify the externally-stored snapshots and infect them. Illustratively, snapshot data is stored repository 112 in disk drive 103 of hardware platform 102, but in alternative embodiments, snapshot data may stored elsewhere, such as in a storage area network (SAN) or network attached storage (NAS) device. It should further be understood that existing snapshots inside guest OSes may be converted to snapshots in external repository 112 to, e.g., clear disk space in the guest OS and reduce storage consumption in system 100, and for deduplication purposes.

It should be understood that a logical snapshot of a volume is simply a sequence of all the bytes in that volume. In one embodiment, repository module 105 may not store the actual full copy of any given volume, as doing so can consume a lot of disk space. Instead, external repository 112 is provided as a central repository of all unique blocks (e.g. a block may be a 4 KB chunk of data). Repository 112 may then be used to store, for each logical snapshot, a metadata block map that indicates which unique blocks the snapshot includes and where the blocks are located in external repository 112. The block map may generally include any data structure mapping volume offsets into a checksum of a unique block, and the snapshot then only consumes storage space required for the metadata of the block map. The block map metadata itself may be stored along with, e.g., the snapshot description.

As discussed in greater detail below with respect to FIG. 3, the process of reverting to a snapshot may include overlaying the snapshot's block mapping on the current virtual disk, which does not require copying block data and can be performed substantially instantaneously. Instead, to revert to a particular snapshot, repository module 105 may create, from the snapshot's block mapping, a synthetic block device that emulates a virtual disk and add the synthetic block device as a delta disk on top of the current virtual disk in a disk hierarchy. This process is also referred to herein as "overlaying the snapshot's block mapping on the current virtual disk." When acting as a delta disk, the synthetic block device tracks differences from the current virtual disk, with writes being performed to the delta disk and reads trying the delta disk first and then the virtual disk if necessary. It should be understood that guest OS blocks and virtual disk blocks do not have to perfectly align (e.g., the block sizes may be different), as a synthetic block device can still be created that synthesizes and map things appropriately.

Although a particular system architecture 100 is illustrated in FIG. 1, techniques similar to those disclosed herein may be implemented in computer systems having other architectures.

Figure 2:
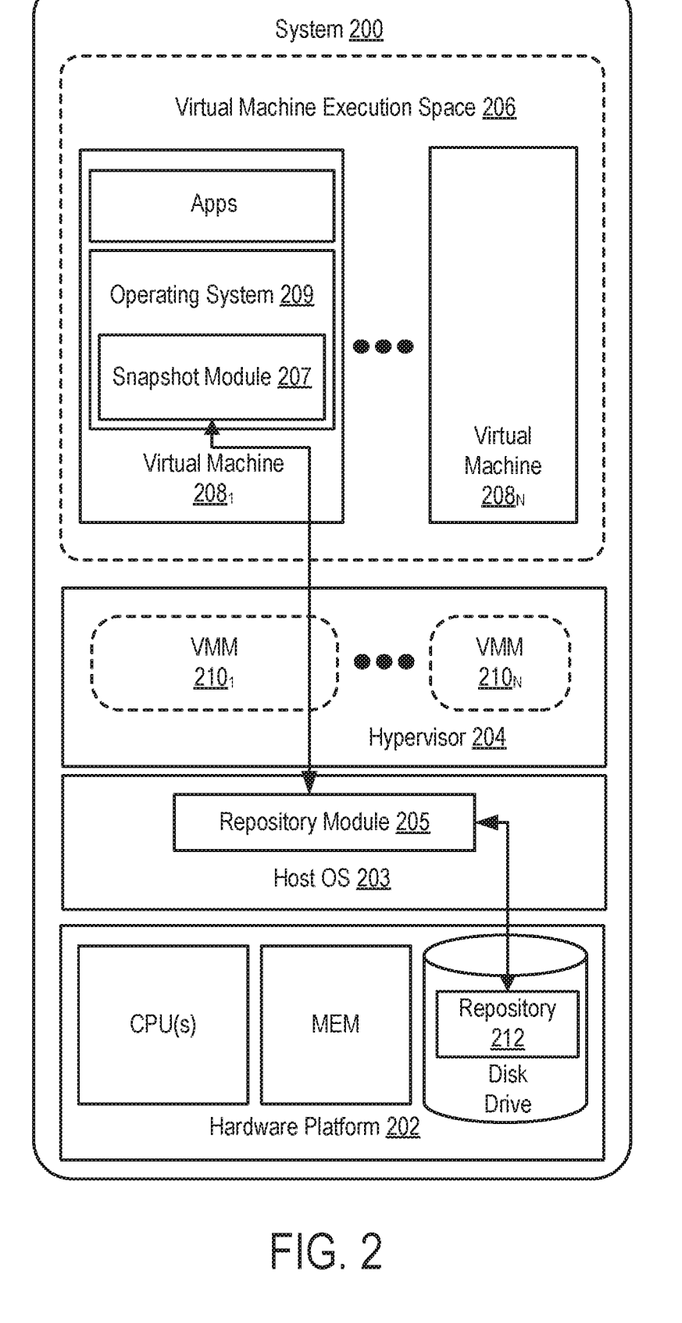
FIG. 2 illustrates components of a system in which another embodiment may be implemented.

FIG. 2 illustrates components of a system 200 in which another embodiment may be implemented. As shown, system 200 includes a similar hardware platform 202 as the hardware platform 102 of system 100. However, virtualization software layer 204 in system 200 is a so-called "hosted" hypervisor installed on top of a commodity OS 203, such as Microsoft® Windows or Linux®, rather than on system hardware 202 itself.

Similar to guest OS 109, guest OS 209 includes a snapshot module 207 which receives blocks for a snapshot of a guest OS 209 volume and communicates with a repository module 205 to create a snapshot file for storing the snapshot in a repository 212 outside the virtual disk of VM $208_1$. Unlike repository 112, external repository 212 that is maintained by repository module 205 may also store snapshots from host OS 209, and snapshots from VMs $208_{1-N}$ may be deduplicated with each other as well as with snapshots from host OS 209 to reduce storage space requirements. Repository module 205 is further responsible for reverting guest OSes to stored snapshots by, e.g., overlaying a snapshot's block mappings on top of the current virtual disk, similar to repository module 105.

Figure 3:
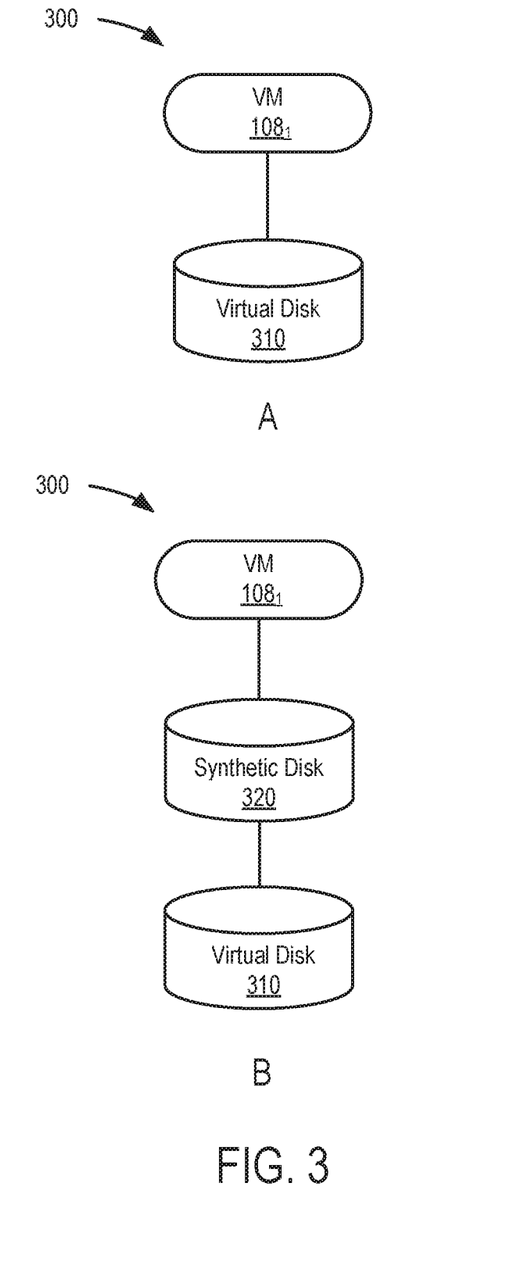
FIG. 3 illustrates an approach for reverting to a stored snapshot, according to an embodiment.

FIG. 3 illustrates an approach for reverting to a stored snapshot, according to an embodiment. As shown in panel A, prior to a reversion operation, VM $108_1$'s disk contents are stored in virtual disk 310. In one embodiment, virtual disk 310 may be a file in, e.g., the .vmdk file format. It should also be understood that virtual disk 310 may also be representative of a disk hierarchy having a read-only base disk and delta disk(s) that each track differences from the base disk and parent delta disks, if any. A parent/child relationship exists when a delta disk is associated with a base disk (or another delta disk), and such relationships may be indicated by metadata in the base and/or delta disks. An advantage of creating delta disks is that only the differences between the delta disk and its parent disk at a particular point in time are stored rather than a full image of the virtual disk. The amount of storage required is thus less when storing delta disks, resulting in more efficient storage and faster transfers between storage devices.

Panel B illustrates that, to revert to a snapshot, repository module 105 (or repository module 205) creates, from the block mapping for the snapshot, a synthetic block device 320 that emulates a virtual disk. As discussed, the block mapping for a snapshot includes metadata that indicates the locations in external repository 112 of blocks of the snapshot. Synthetic block device 320 is thus a mapping into external repository 112 rather than an ordinary virtual disk file. As previously noted, it should be understood that guest OS blocks and virtual disk blocks of synthetic block device 320 do not have to perfectly align (e.g., the block sizes may be different), as synthetic block device 320 can still be created that synthesizes and map things appropriately.

After creating synthetic block device 320, repository module 105 further adds synthetic block device 320 as a delta disk on top of the current virtual disk 310 in a virtual disk hierarchy. That is, synthetic block device 320 is added as a child of virtual disk 310 by, e.g., specifying the parent/child relationship in metadata of synthetic block device 320 and/or virtual disk 310. The creation of the synthetic block device 320, and the adding of said device as the child of child disk 320, do not require copying block data and can be performed substantially instantaneously. As the delta disk, synthetic block device 320 then tracks differences from virtual disk 310, with writes being performed to the delta disk and reads trying the delta disk first and then virtual disk 310 if necessary.

Figure 4:
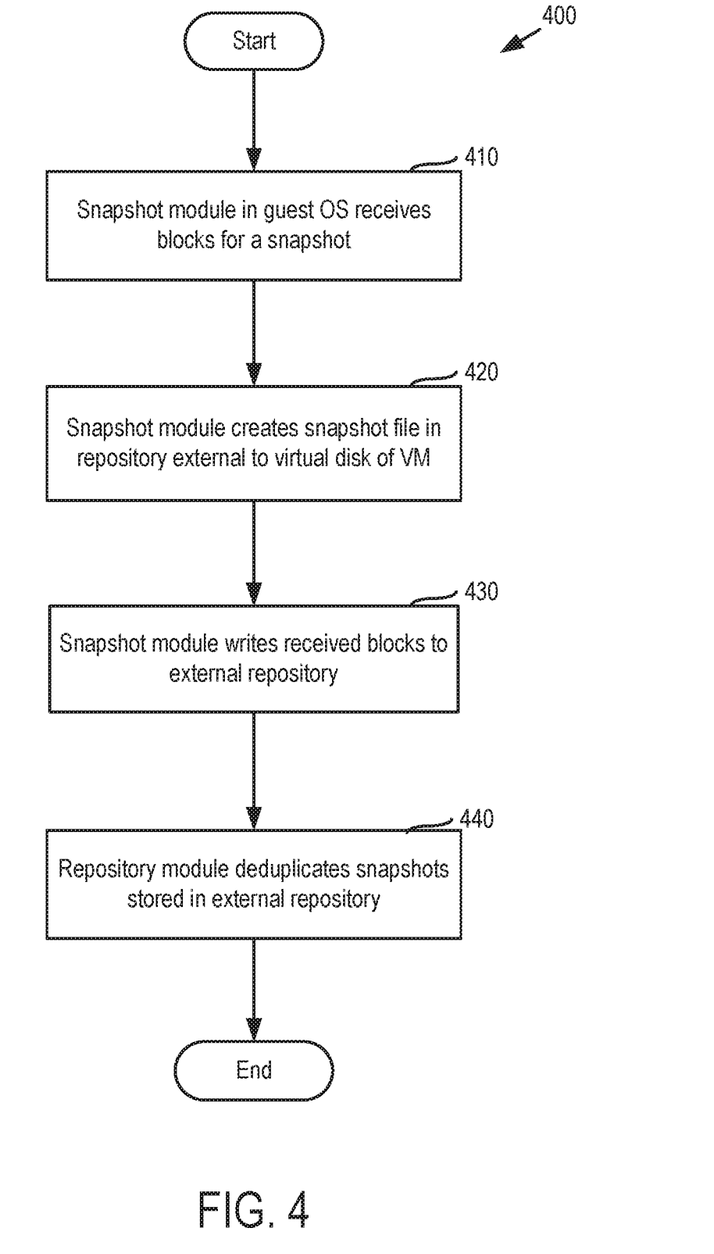
FIG. 4 illustrates steps of a method for creating a guest operating system snapshot, according to an embodiment.

FIG. 4 illustrates a method 400 for creating a guest OS snapshot, according to an embodiment. Although method 400 is discussed primarily with respect to system 100 of FIG. 1, it should be understood that method 400 is also applicable, with minor modifications, to system 200 of FIG. 2. As shown, method 400 begins at step 410, where snapshot module 107 in guest OS 109 receives blocks for a snapshot. As discussed, snapshot module 107 may be a plugin to a service, such as Microsoft® Windows's volume shadow copy service, that coordinates snapshotting activities across the system to implement a copy-on-write mechanism for copying blocks of a volume to the snapshot when those blocks are changed. The copy-on-write mechanism permits applications to continue to write to the volume while a snapshot of it is being taken. The Microsoft® Windows volume shadow copy service, or a similar service, may provide copied blocks as input to snapshot module 107 at step 410. In alternative embodiments, snapshot module 107 itself, or some other module may perform the same functionality as the Microsoft® Windows volume shadow copy service.

At step 420, snapshot module 107 creates a snapshot file in repository 112 external to a virtual disk of VM 108. In one embodiment, snapshot module 107 communicates with repository module 105, which maintains external repository 112, via a communication channel between guest OS 109 and hypervisor 104. In such a case, snapshot module 107 may employ the communication channel to create a new snapshot file with a user-specified or automatically generated name (e.g., the "Restore Point Before Microsoft® Office Installation").

At step 430, snapshot module 107 writes the blocks received at step 310 to external repository 112. Similar to the creation of the snapshot file, snapshot module 107 may write the received blocks to external repository 112 via the communication channel between guest OS 107 and hypervisor 104. In one embodiment, snapshot module 107 may transmit the received blocks to repository module 105, which as discussed is responsible for maintaining external repository 112 and also deduplicates snapshot files stored therein. This is in contrast to the traditional approach for creating snapshots, in which snapshot data is stored in files that are part of the guest OS (e.g., Windows) partition inside the VM. By instead storing snapshots outside the VM's virtual disk, embodiments described herein make it more difficult for malicious software such as APTs to modify the snapshots and infect them. Further, the size of external repository 112 may be dynamically changed to accommodate more (or fewer) snapshots, rather than being limited to the VM's local disk size.

At step 440, repository module 105 deduplicates the snapshots stored in external repository 112. Guest OS snapshots (and host OS snapshots for the embodiment illustrated in FIG. 2) may have similar content when users behave similarly, and, in such cases, deduplicating the snapshots can reduce the amount of storage space required to store them. In one embodiment, repository module 105 may calculate a checksum for each block received from snapshot module 107 and only store a block in the external respository if the checksum does not match the checksum value for any blocks already stored in the external respository. If the checksum does match a stored checksum for a block that is stored in external repository 112, then repository module 105 may instead store a mapping of the offset of the block to the matching checksum in the snapshot's block mapping. In alternative embodiments, other deduplication techniques may be employed.

Figure 5:
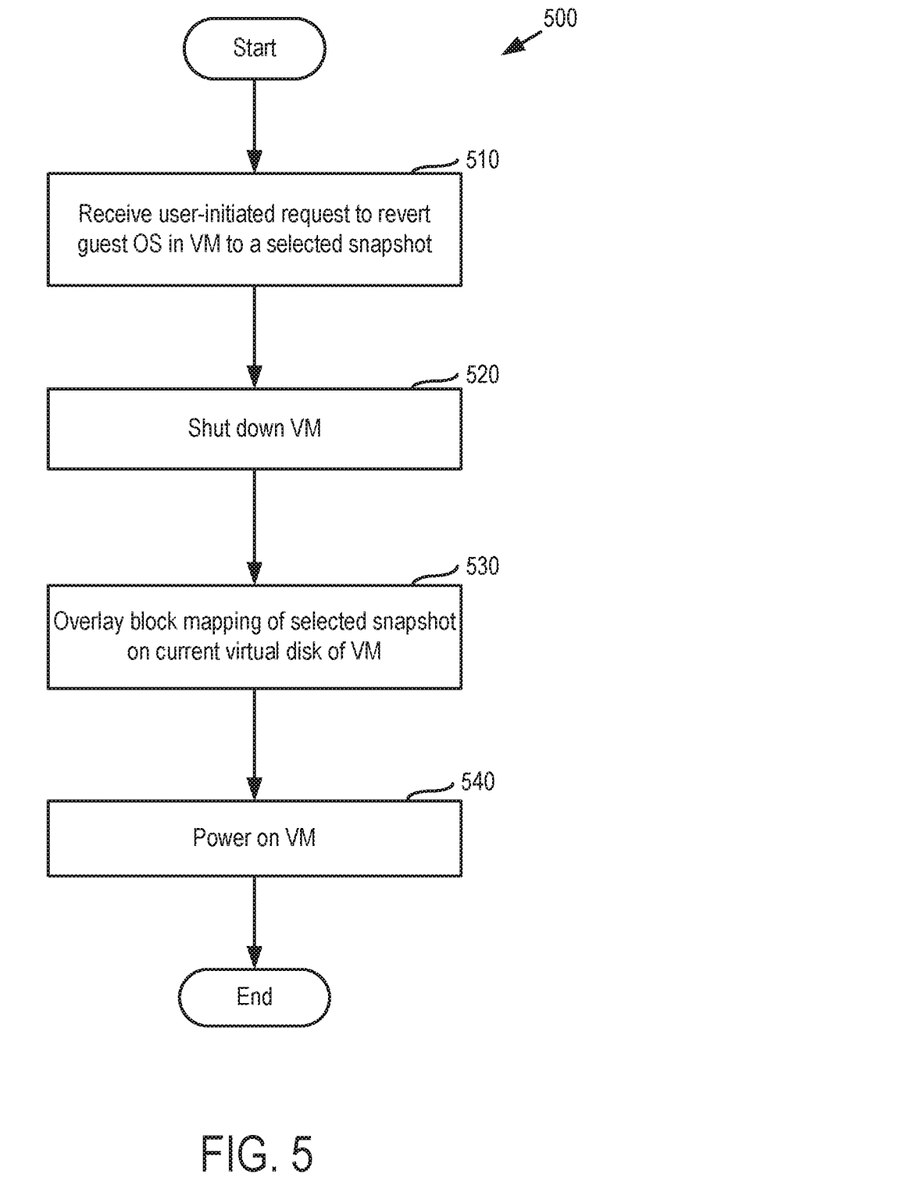
FIG. 5 illustrates steps of a method for reverting to a stored snapshot, according to an embodiment.

FIG. 5 illustrates a method for reverting to a stored snapshot, according to an embodiment. Although method 500 is discussed primarily with respect to system 100 of FIG. 1, it should be understood that method 500 is also applicable, with minor modifications, to system 200 of FIG. 2. As shown, method 500 begins at step 510, where repository module 105 receives a user-initiated request to revert a guest OS running in a VM to a selected snapshot. In one embodiment, repository module 105 may provide a user interface (UI) which indicates snapshots in snapshot tree(s) by name (e.g., "Restore Point Before Microsoft® Office Installation") and permits the user to select a snapshot to revert to the guest OS to. Each snapshot tree may be populated with snapshots taken by a respective guest OS.

At step 520, repository module 105 shuts down the VM in preparation for the revert operation. Then, at step 530, repository module 105 overlays the block map of the selected snapshot on the virtual disk of the VM. Such an overlaying can be performed because, as discussed, the snapshot is taken at a block level and every block that changes is stored in a block mapping. Repository module 105 may thus overlay the block mapping substantially instantly on top the VM's virtual disk, without copying any data. The overlaying process is discussed above with respect to FIG. 3 and results in a reversion to a disk state at the earlier time when the snapshot was taken. In particular, repository module 105 may create, from the snapshot's block mapping, a block device that emulates a virtual disk and is synthesized from the blocks stored in external respository 112 referenced by the block mapping, without having to create an actual virtual disk file and copying block data to said file. That is, the virtual disk is a mapping into external repository 112 rather than an ordinary virtual disk file. Repository module 105 may add such a synthetic block device as a delta disk on top of the current virtual disk in a disk hierarchy, and the synthetic block device then tracks differences from the current virtual disk, with writes being performed to the delta disk and reads trying the delta disk first and then the virtual disk if necessary.

In another embodiment, repository module 105 may actually copy blocks from external repository 112 to a new virtual disk file and add the virtual disk file as a delta disk on top of the current virtual disk. That is, rather than overlaying the block map on the current virtual disk by creating a synthetic block device, repository module 105 may create an ordinary virtual disk by copying the appropriate blocks from external repository 112 to a new virtual disk file, and add the new virtual disk as a delta disk on top of the current virtual disk. It should be understood that the copying of blocks will take more time than the overlaying operation.

At step 540, repository module 105 powers the VM back on, and the guest OS has been reverted to the earlier time when the snapshot was taken.

Advantageously, techniques disclosed herein store guest OS snapshot content outside the VM's virtual disk in an external repository, thereby overcoming disk space limitations in local VM disks and making it more difficult for malicious software such as APTs to modify the snapshots and infect them. Snapshots stored in the external repository may also be deduplicated with other snapshots stored therein, including snapshots from other guest OSes and/or a host OS. In addition, reversions to a snapshot may be achieved by overlaying the snapshot's block mapping on top of the current virtual disk, which does not require copying data and can be done even if the guest OS has completely malfunctioned and cannot itself perform the "revert to restore point" functionality.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of creating a snapshot of a guest operating system (OS) volume, the guest OS running in a virtual machine (VM) on top of a hypervisor, the method comprising:
   receiving, for the snapshot, copies of changed blocks in the guest OS volume obtained via a copy-on-write technique, wherein the snapshot is a volume or partition-level snapshot initiated by the guest OS rather than a virtual disk snapshot initiated by the hypervisor;
   creating a snapshot file in a block storage external to a virtual disk of the VM, wherein the external block storage is shared by a plurality of VMs running on top of the hypervisor; and
   writing the received copies of the changed blocks in the guest OS volume to the snapshot file in the external block storage.

2. The method of claim 1, further comprising, deduplicating a plurality of snapshots stored in the external block storage.

3. The method of claim 2, wherein the plurality of snapshots include snapshots from the plurality of VMs running on top of the hypervisor.

4. The method of claim 3, wherein the plurality of snapshots further includes one or more snapshots from a host OS on which the hypervisor runs.

5. The method of claim 1, further comprising, in response to a request to revert to the snapshot, overlaying the snapshot as a delta disk on top of the virtual disk of the VM, the delta disk tracking differences from the virtual disk of the VM.

6. The method of claim 5, wherein the delta disk is a synthesized block device created from a mapping to blocks stored in the external block storage without copying the blocks stored in the external block storage to a virtual disk file.

7. The method of claim 5, wherein the overlaying is performed by a module in the hypervisor or in a host OS on which the hypervisor runs.

8. The method of claim 1, wherein the receiving, creating, and writing steps are performed by a guest OS module that is in communication with the hypervisor via a communication channel.

9. A non-transitory computer-readable storage medium containing a program which, when executed by one or more processors, performs operations for creating a snapshot of a guest operating system (OS) volume, the guest OS running in a virtual machine (VM) on top of a hypervisor, the operations comprising:
   receiving, for the snapshot, copies of changed blocks in the guest OS volume obtained via a copy-on-write technique, wherein the snapshot is a volume or partition-level snapshot initiated by the guest OS rather than a virtual disk snapshot initiated by the hypervisor;
   creating a snapshot file in a block storage external to a virtual disk of the VM, wherein the external block storage is shared by a plurality of VMs running on top of the hypervisor; and
   writing the received copies of the changed blocks in the guest OS volume to the snapshot file in the external block storage.

10. The non-transitory computer-readable storage medium of claim 9, the operations further comprising, deduplicating a plurality of snapshots stored in the external block storage.

11. The non-transitory computer-readable storage medium of claim 10, wherein the plurality of snapshots include snapshots from the plurality of VMs running on top of the hypervisor.

12. The non-transitory computer-readable storage medium of claim 11, wherein the plurality of snapshots further includes one or more snapshots from a host OS on which the hypervisor runs.

13. The non-transitory computer-readable storage medium of claim 9, the operations further comprising, in response to a request to revert to the snapshot, overlaying the snapshot as a delta disk on top of the virtual disk of the VM, the delta disk tracking differences from the virtual disk of the VM.

14. The non-transitory computer-readable storage medium of claim of claim 13, wherein the delta disk is a synthesized block device created from a mapping to blocks stored in the external block storage without copying the blocks stored in the external block storage to a virtual disk file.

15. The non-transitory computer-readable storage medium of claim of claim 13, wherein the overlaying is performed by a module in the hypervisor or in a host OS on which the hypervisor runs.

16. The non-transitory computer-readable storage medium of claim of claim 9, wherein the receiving, creating, and writing steps are performed by a guest OS module that is in communication with the hypervisor via a communication channel.

17. A system, comprising:
   a processor; and
   a memory, wherein the memory includes a program executable in the processor to perform operations for creating a snapshot of a guest operating system (OS) volume, the guest OS running in a virtual machine (VM) on top of a hypervisor, the operations comprising:
      receiving, for the snapshot, copies of changed blocks in the guest OS volume obtained via a copy-on-write technique, wherein the snapshot is a volume or partition-level snapshot initiated by the guest OS rather than a virtual disk snapshot initiated by the hypervisor, creating a snapshot file in a block storage external to a virtual disk of the VM, wherein the external block storage is shared by a plurality of VMs running on top of the hypervisor, and writing the received copies of the changed blocks in the guest OS volume to the snapshot file in the external block storage.

18. The system of claim 17, the operations further comprising:

deduplicating a plurality of snapshots stored in the external block storage, wherein the plurality of snapshots include snapshots from the plurality of VMs running on top of the hypervisor and/or one or more snapshots from a host OS on which the hypervisor runs.

19. The system of claim 17, the operations further comprising, in response to a request to revert to the snapshot, overlaying the snapshot as a delta disk on top of the virtual disk of the VM, the delta disk tracking differences from the virtual disk of the VM.

20. The system of claim 19, wherein the delta disk is a synthesized block device created from a mapping to blocks stored in the external block storage without copying the blocks stored in the external block storage to a virtual disk file.

* * * * *